Patented Nov. 1, 1927.

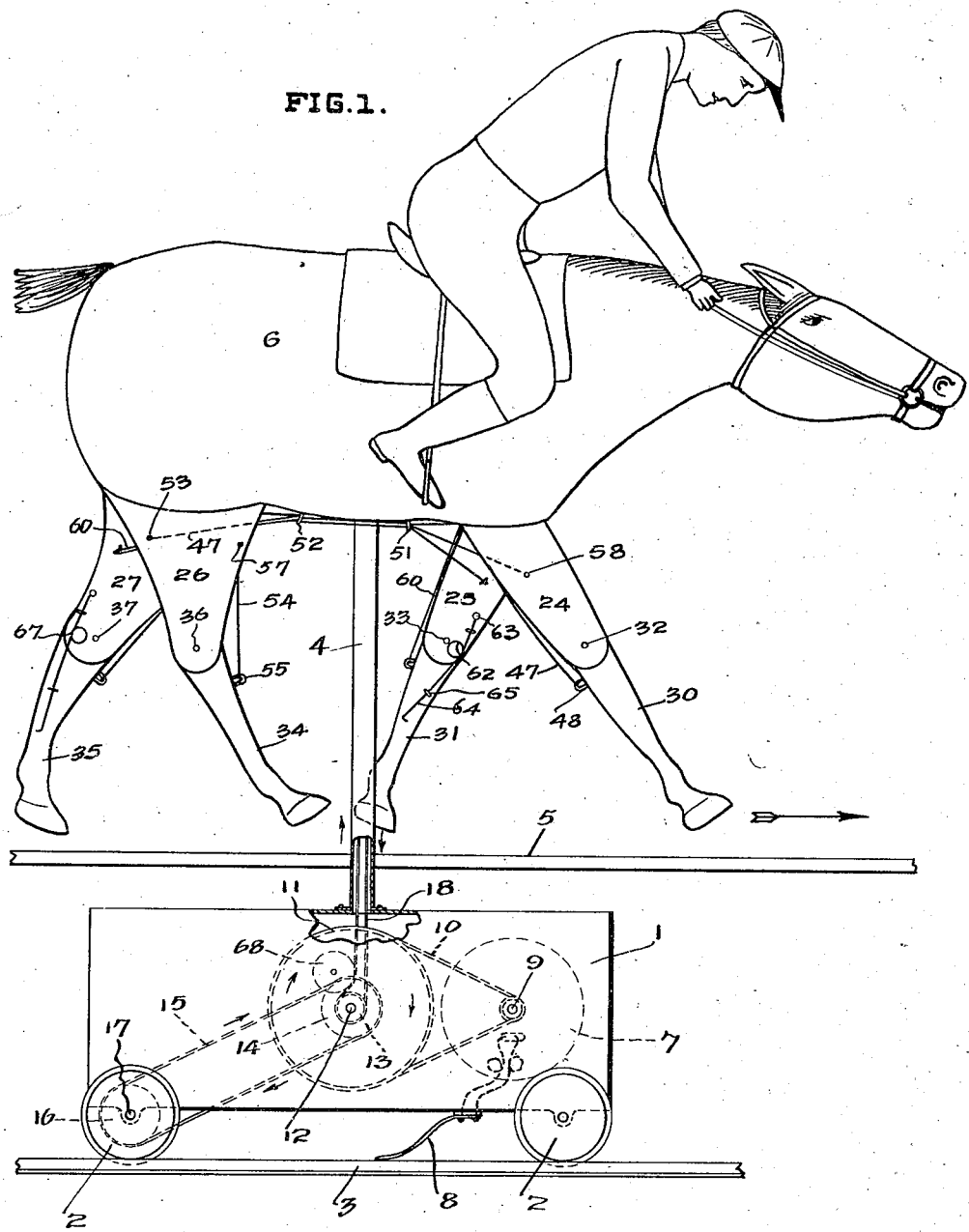

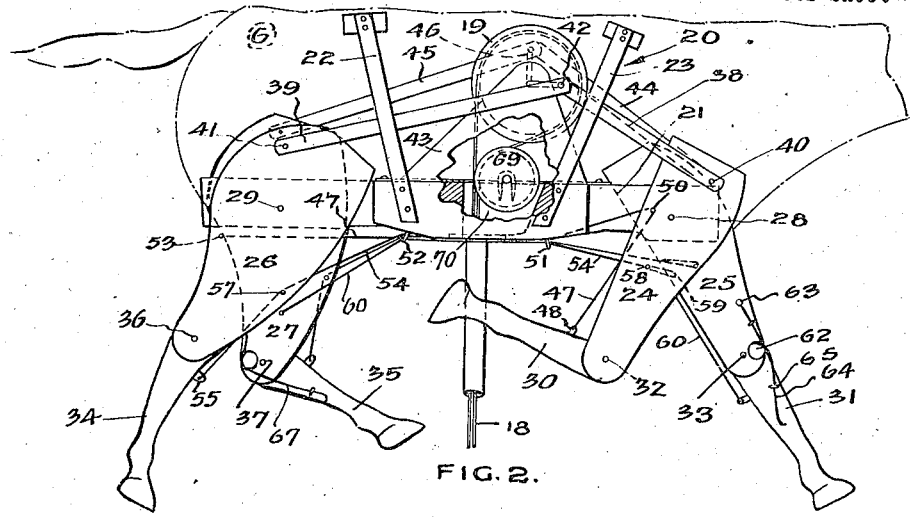

1,647,507

UNITED STATES PATENT OFFICE.

CLAUD CROSS, OF STANFORD UNIVERSITY, CALIFORNIA.

MECHANICALLY-OPERATED TOY.

Application filed January 19, 1926. Serial No. 82,173.

The present invention relates to improvements in mechanically operated toys, and has reference more particularly to mechanically operated animals borne above a circularly slotted platform by hollow pedestals extending through the slots and carried by motor driven trucks travelling upon continuous tracks located beneath the platform, the movement of the truck mechanisms serving to carry the animals in a forward direction around tracks, the mechanical movements necessary to impart action to the animals being accomplished through transmission systems passing from the driving motors of the trucks through the hollow pedestals to interior mechanisms borne by the animals and thence through external connections, such as cords or wires, to the limbs of the animals for imparting thereto the desired lifelike action.

The principal object of my invention is the provision of mechanically operated toys of the character described, the bodies of which are of lifelike appearance and carry therewithin concealed mechanical means coacting with exterior agencies for the actuation of the limbs thereof in imitation of the limb-action of animals in running, pacing or trotting.

Another object of the invention is the provision of a device of the character designated that is adaptable for service in the creation of mimic races, through the employment of a plurality of parallel tracks, forming a race course, and an equal number of animals, each being operated separately and at variable speeds to simulate racing, the tracks being arranged in sections and energized to vary the forward speeds of the animals at different points in their courses.

Further objects and advantages will be apparent with reference to the subjoined specification and accompanying two sheets of drawings, in which:

Figure 1 is a side elevation of a toy horse embodying the principles of my invention, the body being mounted upon a pedestal supported by a power driven truck borne by a track concealed below a slotted platform;

Figure 2 is a side elevation, with the body portion of the animal removed to show the arrangement of the interior mechanism and its connections exteriorly to the fore and hind legs of the animal;

Figure 3 is a top plan view of the interior mechanism of the animal, showing the shape of the supporting frame and the arrangement of the legs relative thereto, also the crank mechanism for the actuation of the legs;

Figure 4 is a detail view of the supporting frame, showing the method of connecting the fore and hind legs of the right-hand side of the animal together by flexible cord, or like, connections;

Figure 5 is a side elevation, partly in section, of the fore leg of the right-hand side, showing the flexible actuating connections and hinged knee-joint;

Figure 6 is a front edge view of the fore leg of the right-hand side, as shown in Figure 5, illustrating the spring connection for normally keeping the leg in extended or straightened position;

Figure 7 is a side elevation, partly in section, of the right-hand hind leg, showing the flexible actuating connections and hinged hock-joint; and Figure 8 is a front edge view of the right-hand hind leg, showing the spring connection of the hock-joint, similar to the spring connection of the fore leg.

Referring to the drawings with greater particularity, an embodiment of my invention is illustrated in Figure 1, and comprises a frame 1 mounted upon flanged wheels 2 borne by a track 3.

The frame 1 carries a hollow pedestal 4 extending upwardly therefrom through a slotted platform 5 and supports at its upper end an animal body 6, represented here as being that of a horse in trotting position, the body being supported a sufficient distance above the platform to barely allow the hoofs to clear the platform when the limbs are being actuated by the mechanism, as hereinafter described.

The truck frame 1 carries a small motor 7 adapted to receive electrical energy from the track 3 through a brush 8, the motor 7 being connected through its pinion 9 and belt 10 to a large pulley 11 mounted upon a shaft 12 positioned centrally of the frame 1, this shaft, in turn, bearing a small pulley 13 and a third pulley 14 connected by belt 15 to a pulley 16 mounted upon the shaft 17 of the truck wheels 2.

An endless belt 18 runs from the small pulley 13 upwardly through the hollow pedestal 4 and extends around the pulley 19 of the actuating mechanism 20 mounted within the body 6 of the animal.

The mechanism 20 and body 6 of the animal are supported by a longitudinal 21 rigidly mounted upon the upper end of the hollow pedestal 4 and carrying supports 22 and 23.

The body portion of the animal may be constructed of paper-mache, metal, or other suitable material and of hollow formation to afford proper housing for the mechanism intended for direct operation of the animal's various parts, as illustrated in Figure 1.

The fore and hind legs 24, 25, 26 and 27, constructively, may be formed of wood, or hollow metal, are arranged in pairs and pivotally connected to opposite sides of the longitudinal 21 by pins 28 and 29, the right-hand fore leg 24 and the right-hand hind leg 26 being connected to operate in unison, as are, also, the left-hand fore leg 25 and the left-hand hind leg 27.

The right and left fore legs 24 and 25 are provided, respectively, with hinged shank members 30 and 31 joined together by the knee-joint pivots 32 and 33, and the right and left-hand hind legs 26 and 27, respectively, with hinged shank members 34 and 35 pivotally connected at 36 and 37, forming the hock-joints of the animal.

The right fore and hind legs 24 and 26 are actuated in unison by means of links 38 and 39 pivotally connected to said legs at points 40 and 41 positioned some distance above the points 28 and 29 thereof, the said links being connected to a crank member 42 borne by the pulley 19 of the actuating mechanism 20, which is held positioned above the longitudinal 21 by means of a bearing bracket 43.

The left fore and hind legs 25 and 27 are actuated in unison by means of links 44 and 45, which are connected to the opposite crank member 46 positioned at, approximately, ninety degrees relative to the position of the crank member 42.

The flexing movement of the fore shank member 30 of the right fore leg is accomplished by means of a flexible connection of cord, or wire, 47, one end of which is attached to said fore leg shank 30 by an eyelet 48 situated slightly below the knee-joint 32, extending therefrom through a slot 49 to and over a pin 50 carried therein and positioned adjacent the shoulder joint 28, and from thence rearwardly through eyelets 51 and 52, positioned on the underside of the longitudinal 21, to the pin 53, located on the inside of the hind leg 26, to which it is secured, the movement of the hind leg 26, as actuated by the crank member 42, serving to impart the necessary pull, through the medium of the cord, or wire, 47 and the coactive operation of the fore leg 24, to effect the required movement of the shank 30.

The flexing movement of the right hind leg shank member 34 is effected by means of a cord, or wire, 54 connected at one end to said shank member by an eyelet 55 situated slightly below the hock-joint 36, extending therefrom into a slot 56 and over a pin 57 positioned approximately midway between the points 29 and 36 thence forwardly through the eyelets 52 and 51 to the pin, or eyelet, 58 mounted on the inside of the fore leg 24 at a point substantially midway between the points 32 and 28, to which it is attached by a loop 59, the necessary pull being imparted to the cord, or wire, 54, upon the forward movement of the fore leg, to flex the hind shank member 34 to effect the required movement of said shank, the loop 59 of the cord, or wire, yielding sufficient slack to permit of considerable forward movement of said fore leg before the cord, or wire, is drawn taut.

The left fore leg shank member 31 is connected to the left hind leg 27 by a cord, or wire, 60, and the left hind leg shank member 35 to the left fore leg 25, in manner identical with that just described for the corresponding members of the right side of the animal and functions in manner precisely the same.

The knee-joints 32 and 33 of both fore legs 24 and 25 are alike, each consisting of hinge members having stops 61 adapted to allow the shanks to flex inwardly only, each of said joints being also provided with coiled spring members 62 secured to the inner sides of the fore legs by eyelets, or fasteners, 63, the lower ends 64 thereof extending through eyelets 65 secured to the inner faces of the shank members, the urge of said springs tending to normally straighten the shank members relative to the fore legs.

The hock-joints 36 and 37 of the hind legs 26 and 27 are of like construction, each comprising hinge members provided with stops 66, similar to the stops 61 of the fore legs but of opposite disposition, each of said joints being also provided with spring members 67 secured to the hind legs and shanks, as described in connection with the springs 62 of the fore legs.

In operation, the motor 7, when energized, drives the truck 1 forwardly upon the track 3 and, simultaneously therewith, drives the endless cord-belt 18, two sections of which are held in close proximity for travelling through the tubular pedestal 4 by an idler 68 mounted in the frame of the truck and a second idler 69 mounted in the slot 70 formed in the longitudinal 21, the truck-supported pedestal 4 being borne therealong and therewith, following its circular slot and bearing, in turn, its supported animal, whose internal mechanism, through the transmission, has been set in motion for imparting a natural and lifelike action to the limbs of the animal.

I claim, and desire to secure by Letters Patent:

A mechanically operated animal adapted for the simulation of motion, including in combination, an upper and lower platform in spaced relation, the upper platform bearing a circular slot and the lower a circular track, a motor driven truck adapted to travel on said track, a gear mechanism borne by said truck and operatively connected with said motor, a hollow pedestal vertically borne by said truck and extending an appreciable distance beyond the surface of said upper platform through said circular slot and adapted for travel therein and thereabout, an animal bearing limb-actuating elements borne balanced upon the upper extremity of said pedestal and fixedly secured thereto, and driving means connecting said gear mechanism through said hollow pedestal with said limb-actuating elements, for creating simulation of motion in said animal through operation of said truck.

In testimony whereof I have affixed my signature.

CLAUD CROSS.